US009620997B2

(12) United States Patent
Manfe et al.

(10) Patent No.: US 9,620,997 B2
(45) Date of Patent: Apr. 11, 2017

(54) FLUX-SWITCHING MACHINE

(71) Applicant: MOTEURS LEROY-SOMER, Angouleme (FR)

(72) Inventors: Philippe Manfe, Linars (FR); Benjamin Gaussens, La Masquere (FR)

(73) Assignee: MOTEURS LEROY-SOMER, Angouleme (FR)

(*) Notice: Subject to any disclaimer, the term of this patent is extended or adjusted under 35 U.S.C. 154(b) by 0 days.

(21) Appl. No.: 14/357,739

(22) PCT Filed: Nov. 7, 2012

(86) PCT No.: PCT/IB2012/056235
§ 371 (c)(1),
(2) Date: May 12, 2014

(87) PCT Pub. No.: WO2013/068947
PCT Pub. Date: May 16, 2013

(65) Prior Publication Data
US 2014/0346912 A1   Nov. 27, 2014

(30) Foreign Application Priority Data

Nov. 10, 2011   (FR) ...................... 11 60278

(51) Int. Cl.
*H02K 1/16* (2006.01)
*H02K 19/12* (2006.01)
*H02K 19/26* (2006.01)

(52) U.S. Cl.
CPC ............ *H02K 1/165* (2013.01); *H02K 19/12* (2013.01); *H02K 19/26* (2013.01)

(58) Field of Classification Search
CPC .................. H02K 1/165; H02K 3/28
USPC .................................. 310/179–210
See application file for complete search history.

(56) References Cited

U.S. PATENT DOCUMENTS

| 3,253,170 A | | 5/1966 | Phillips et al. | |
|---|---|---|---|---|
| 5,838,087 A | * | 11/1998 | Tang ............................. | 310/168 |
| 6,051,904 A | * | 4/2000 | Akemakou ................... | 310/171 |
| 6,078,122 A | * | 6/2000 | Tang et al. .................... | 310/165 |
| 6,160,330 A | * | 12/2000 | Sakamoto ................ | H02P 8/32 |
| | | | | 310/112 |
| 6,242,834 B1 | * | 6/2001 | Akemakou .................. | 310/162 |
| 6,271,613 B1 | * | 8/2001 | Akemakou .......... | H02K 21/042 |
| | | | | 310/181 |
| 7,709,989 B2 | * | 5/2010 | Smith .......................... | 310/166 |

(Continued)

FOREIGN PATENT DOCUMENTS

| EP | 0 909 010 A1 | 4/1999 |
|---|---|---|
| FR | 2 898 439 A1 | 9/2007 |
| JP | A-8-9607 | 1/1996 |

OTHER PUBLICATIONS

Chen et al., "Low Cost Flux-Switching Brushless AC Machines," 978-1-4244-8218-4/10© Crown.

(Continued)

*Primary Examiner* — Naishadh Desai
(74) *Attorney, Agent, or Firm* — Oliff PLC

(57) ABSTRACT

The present invention relates to a flux-switching machine, including a stator having phase windings and field coils, wherein, in the machine, at least one field coil is arranged in a pair of notches separated by at least three teeth.

12 Claims, 2 Drawing Sheets

(56) References Cited

U.S. PATENT DOCUMENTS

Figure 1:
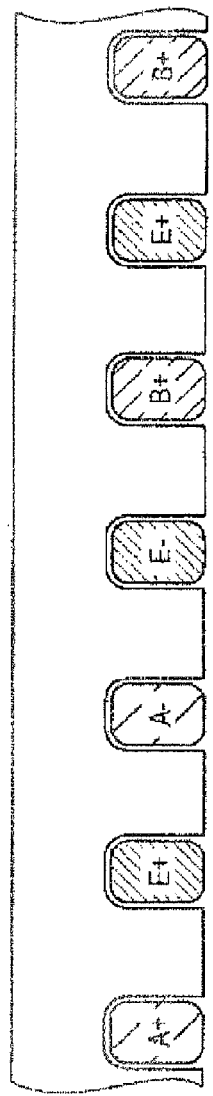

| | | | |
|---|---|---|---|
| 2008/0174195 A1* | 7/2008 | Tupper | H02K 19/20 310/179 |
| 2010/0052626 A1* | 3/2010 | Tupper | H02P 9/48 322/61 |
| 2010/0072832 A1* | 3/2010 | Zhu et al. | 310/49.46 |
| 2010/0123426 A1* | 5/2010 | Nashiki | H02K 1/12 318/701 |
| 2011/0163618 A1 | 7/2011 | Kanazawa et al. | |

OTHER PUBLICATIONS

Zulu et al., "A Wound-Field Three-Phase Flux-Switching Synchronous Motor with All Excitation Sources on the Stator," *IEEE*, 2009, pp. 1502-1509.
Chen et al., "A Novel E-core Flux-switching PM Brushless AC Machine," *IEEE*, 2010, pp. 3811-3818.
Pollock et al., "Low Cost, High Power Density, Flux Switching Machines and Drives for Power Tools," *IEEE*, 2003, pp. 1451-1457.
Sulaiman et al., "A New Structure of 12Slot-10Pole Field-Excitation Flux Switching Synchronous Machine for Hybrid Electric Vehicles," *EPE*, 2011, Birmingham.
Pollock et al., "Flux-Switching Motors for Automotive Applications," *IEEE Transactions on Industry Applications*, vol. 42, Issue 5, 2006 (abstract only).
International Search Report issued in International Patent Application No. PCT/IB2012/056235 dated Jun. 7, 2013.

* cited by examiner

FLUX-SWITCHING MACHINE

The present invention relates to flux-switching machines and more specifically, but not exclusively, to those referred to as single excitation machines.

A flux-switching machine comprises a non-wound rotor devoid of permanent magnets and a stator comprising phase windings and excitation windings or permanent magnets. The AC voltage at the terminals of the phase windings is produced by the switching of the flux following the rotation of the rotor.

In conventional single excitation machines the stator is formed of a sequence of teeth and grooves, in which an excitation coil and a phase coil are arranged successively.

U.S. Pat. No. 6,242,834 discloses, in FIG. 6, an example of such a machine. FIG. 11 shows a double excitation machine, with grooves housing permanent magnets on the stator.

The following publications "Low Cost Flux—Switching Brushless AC Machines" 978-1-4244-8218-4/10©Crown, "A wound-Field Three-Phase Flux Switching Synchronous Motor with All Excitation Sources on the Stator" 978-1-4244-2893-9/09© 2009 IEEE pages 1502 to 1509, "Low Cost, High Power Density, Flux Switching Machines and Drives for Power Tools", 0-7803-7883-0/03© 2003 IEEE, "Flux Switching Motors for Automotive Applications" 07803-7883-0/03© 2003 IEEE, "A new structure of 12 Slot 10 Pole Field Excitation Flux Switching Synchronous machine for Hybrid Electric Vehicles" EPE 2011 Birmingham, ISBN 9789075815153 pages 1 to 10, and "A Novel E-core Flux Switching PM Brushless AC Machine", 978-1-4244-5287-3/10/$26.00© 2010 IEEE pages 3811-3818 describe further examples of flux-switching machines.

Publication FR 2 898 439 discloses a double excitation flux-switching machine. The grooves in the stator are of unequal shape so as to allow excitation windings and phase windings to be housed simultaneously in the deeper grooves.

EP 0 909 010 discloses a flux-switching electrical machine.

In a known flux-switching machine, each groove receiving conductors of an excitation winding and the two adjacent grooves receiving conductors of phase windings constitute a basic cell.

The excitation coils and the phase coils each cover two teeth pitches on the stator, that is to say the grooves which receive said windings are separated by two teeth.

These machines are generally characterised by the use of a significant quantity of copper or other conductor material in order to form the excitation windings so as to limit the losses sustained due to the Joule effect and the effects thereof on the output.

A further specific feature of these machines is the waveform of the voltage, which often has a strong harmonic factor.

U.S. Pat. No. 3,253,170 discloses a machine in which the teeth of the rotor are inclined (tooth skewing) thanks to a progressive offset of the rotor sheets.

Publication JP 8 009 607 discloses a machine having variable reluctance, not flux-switching, and excited by a winding, in which the flux encompassed by the phase is subject to relatively weak variations because these are produced solely as a result of the reluctance variation below the pole when the rotor turns. The resultant flux is solely positive or unidirectional. In addition, each phase coil surrounds a single tooth of the stator.

The aim of the invention is to propose a novel flux-switching machine aiming to reduce the quantity of conductor material used and to obtain a waveform having a weak harmonic factor, without resorting to the conventional techniques of skewing of the set of stator or rotor sheets, which induce a significant reduction of the power loading.

The invention therefore relates to a flux-switching machine comprising a stator bearing phase windings and excitation windings, in which machine at least one excitation winding is arranged in a pair of grooves separated by at least three teeth.

Thanks to the invention, a machine is produced that functions with fewer excitation coils than in the case of a tooth pitch of two, which results in a saving of conductor material.

A machine according to the invention is compact, without a winding on the turning part, the voltage being controlled from excitation windings arranged on the stator.

The presence of a third tooth for flux feedback between two basic cells makes it possible to generate sinusoidal variations of flux having a very weak harmonic content.

The flux encompassed by each phase is bidirectional (that is to say alternating) and is based on a modification of the path of the flux in the stator by the salience of the rotor. This results in an improved conversion of energy.

Each phase coil preferably surrounds two stator teeth.

The grooves preferably are not empty.

The number of teeth on the rotor may be equal to k×11 or to k×13 and the number of teeth on the stator may be equal to k×18, where k is an integer not equal to zero, for example equal to 1, 2 or 3. This number of teeth produces a voltage having a waveform of good quality.

Such a waveform can be obtained without resorting to techniques in which the set of stator or rotor sheets is skewed, and therefore without reducing the power loading. The teeth may thus be formed without longitudinal skewing.

The excitation coils or phases advantageously have radially oriented axes.

The machine is preferably a single excitation machine, and the stator does not comprise permanent magnets.

In an exemplary embodiment of the invention the stator comprises a single type of phase winding per groove, in particular a single phase winding per groove.

In particular, the grooves where the excitation windings are present do not comprise a phase winding.

The teeth can be regularly spaced circumferentially on the stator.

Each phase winding can encompass two consecutive teeth, that is to say can be housed in the grooves adjacent to said teeth.

The machine may be an alternator or a motor.

Figure 2:
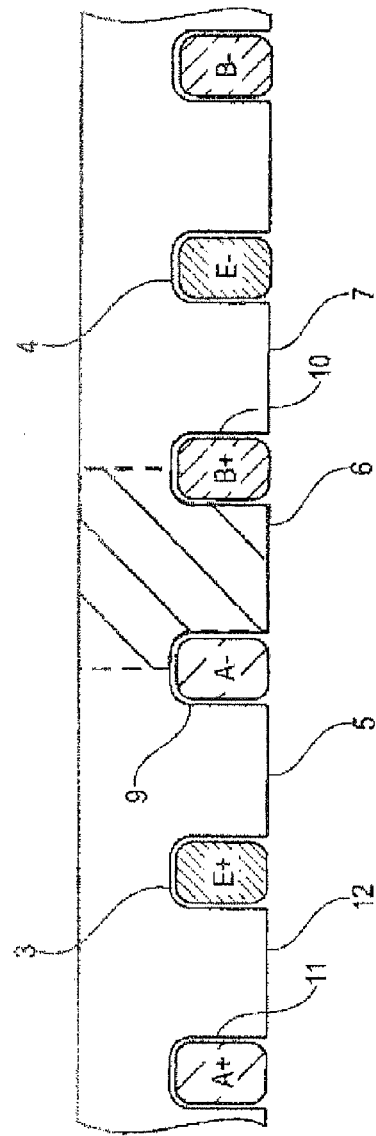
Figure 3:
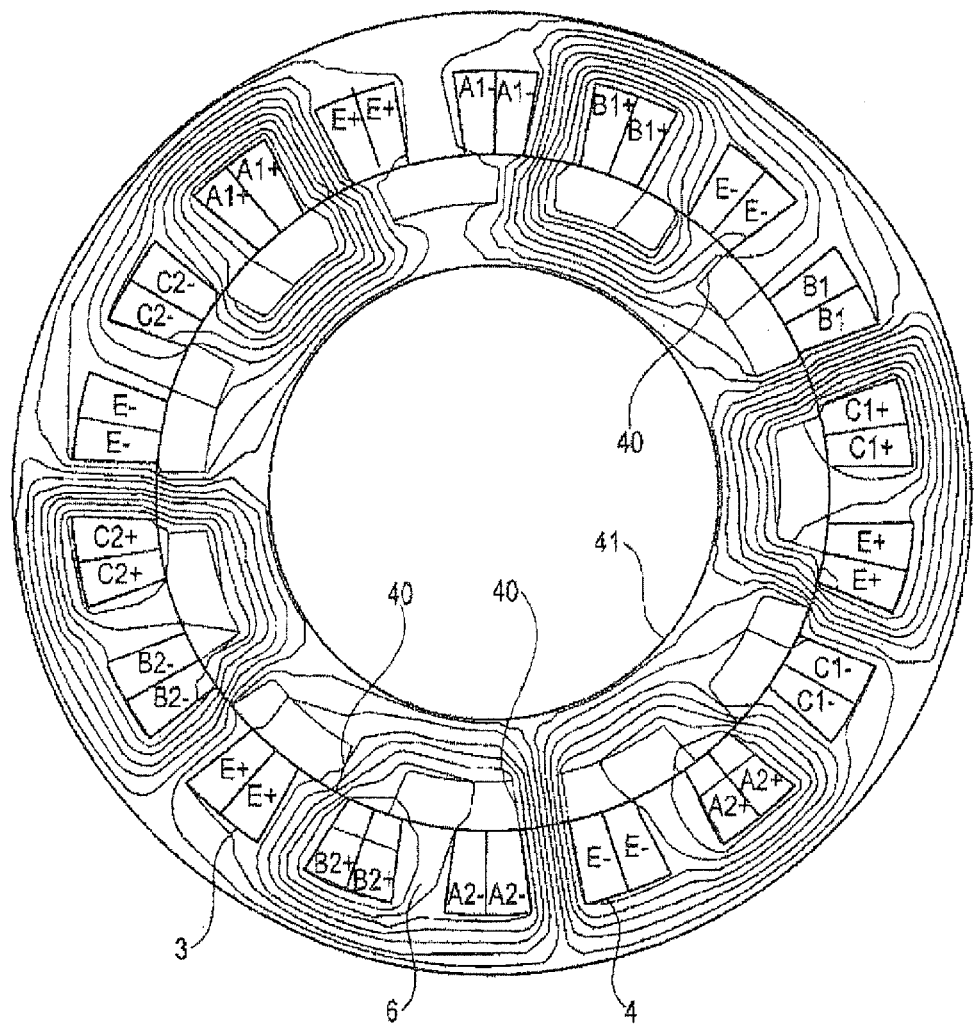
Figure 4:
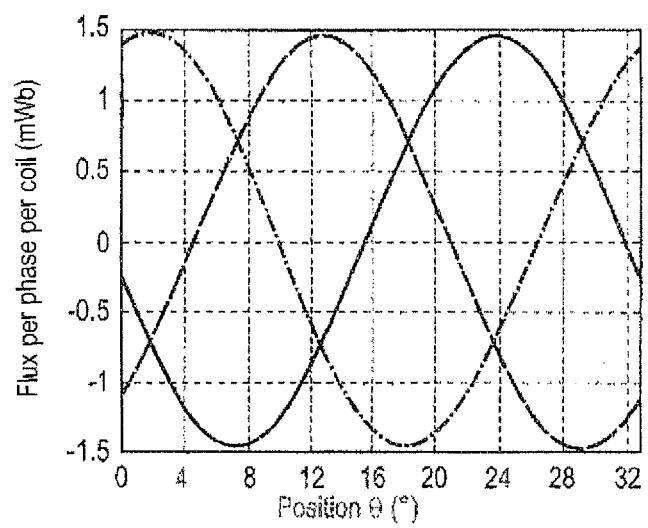

The invention will be better understood upon reading the detailed description hereinafter of non-limiting embodiments of the invention and upon examining the accompanying drawing, in which:

FIG. 1 schematically illustrates a known winding arrangement for a flux-switching machine, FIG. 2 shows an example of a machine according to the invention, FIG. 3 is a simulation result for a specific configuration of the rotor and of the stator, and FIG. 4 shows the waveform of flux as a function of the angular position for the configuration illustrated in FIG. 3.

FIG. 1 shows a structure of a single flux-switching machine. The stator is shown linearly for reasons of simplification.

The machine comprises a sequence of basic cells each formed by a groove containing the conductors E+ or E− of an excitation winding and by two adjacent grooves receiving the conductors of the phase coils A+, A−, B+, B−, C+ or C−, the machine being multi-phased, in particular three-phased, A, B and C denoting the phases.

The excitation windings are connected conventionally to a source of direct current.

By convention, the signs + and − are attributed to the conductors depending on whether they have one direction or another within the groove. The same excitation coil thus comprises conductors E+ and E−.

The axis of each coil is oriented radially.

The tooth pitch of the excitation coils is two, the grooves receiving the conductors of the excitation coils being separated by two teeth.

FIG. 2 shows an example of a machine according to the invention, in which two grooves 3 and 4 receiving the conductors + and − of the same excitation coil E are separated by three teeth 5, 6 and 7, and by two grooves 9 and 10 respectively receiving the windings of two different phases, for example A− and B+ as illustrated.

The grooves receiving the conductors + and − of the same coil of a phase are separated by two teeth and by a groove receiving the conductors + or − of an excitation winding.

For example, as illustrated, the conductors A+ and A− of the phase A are therefore received in grooves 9 and 11 separated by the teeth 5 and 12 and by the groove 3.

The tooth 6 arranged between the grooves 9 and 10 is involved in the feedback of the flux, as can be seen in FIG. 3, which shows the flux lines for a machine having a specific configuration, that is to say a number of teeth on the stator $n_{ds}$ equal to 18 and a number of teeth on the rotor $n_{dr}$ equal to 11. Further configurations are possible, in particular with $n_{dr}=k \times 11$ or $k \times 13$ and $n_{ds}=k \times 18$.

It can be seen in FIG. 3 that the rotor can be formed with protruding teeth 40, without pole shoes, distributed at uniform angles around the axis of rotation. The teeth 40 are each connected to an annular body 41, which is mounted on a shaft (not illustrated). The width of a rotor tooth is preferably, as illustrated, substantially equal to that of a stator tooth.

The rotor and the stator are preferably formed by stacking electrical sheets.

FIG. 4 shows the flux waveform for each of the phases as a function of the angular position of the rotor, for the configuration illustrated in FIG. 3.

A machine according to the invention can be used in any application in which the voltage can be controlled by action on the excitation current, such as applications with variable load and/or speed.

The machine according to the invention can function at constant voltage over a relatively substantial speed range.

The invention is not limited to the illustrated example.

For example, the grooves receiving the excitation windings and those receiving the phase windings may have different shapes and may be offset radially so as to facilitate the mounting of the coils and so as to reduce the axial bulk of the machine.

Permanent magnets can be used on the stator, but the machine preferably is not excited using permanent magnets.

The invention claimed is:

1. A flux-switching machine comprising a stator bearing phase windings and excitation windings, wherein:
   each excitation winding comprises a first conductor and a second conductor,
   the first conductor of at least one excitation winding is arranged in a first groove,
   the second conductor of the at least one excitation winding is arranged in a second groove, and
   the first groove and the second groove are separated by at least three teeth.

2. The machine as claimed in claim 1, the grooves of the pair of grooves being separated by three teeth.

3. The machine as claimed in claim 1, said machine being a single excitation machine.

4. The machine as claimed in claim 1, comprising a single phase winding per groove.

5. The machine as claimed in claim 1, the teeth on the rotor and/or on the stator not being skewed longitudinally.

6. The machine as claimed claim 1, the number of teeth on the rotor $n_{dr}$ being equal to $k \times 11$ or $k \times 13$ and the number of teeth on the stator $n_{ds}$ being equal to $k \times 18$, where k is an integer, not equal to zero.

7. The machine as claimed in claim 6, where k=1, 2 or 3.

8. The machine as claimed in claim 1, the teeth being regularly spaced circumferentially on the stator.

9. The machine as claim 1, said machine being three-phase.

10. The machine as claimed in claim 1, each phase winding encompassing two consecutive teeth.

11. The machine as claimed in claim 1, said machine constituting an alternator.

12. The machine as claimed in claim 1, wherein:
    the first conductor has a positive current, and
    the second conductor has a negative current.

* * * * *